(12) United States Patent
Mizumi et al.

(10) Patent No.: US 11,828,185 B2
(45) Date of Patent: Nov. 28, 2023

(54) STEAM TURBINE SEAL CLEARANCE ADJUSTING METHOD

(71) Applicant: Mitsubishi Power, Ltd., Kanagawa (JP)

(72) Inventors: Shunsuke Mizumi, Tokyo (JP); Ketsu Ko, Tokyo (JP); Juichi Kodera, Yokohama (JP); Masayuki Kayahara, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/613,683

(22) PCT Filed: May 28, 2020

(86) PCT No.: PCT/JP2020/021199
§ 371 (c)(1),
(2) Date: Nov. 23, 2021

(87) PCT Pub. No.: WO2020/241782
PCT Pub. Date: Dec. 3, 2020

(65) Prior Publication Data
US 2022/0235667 A1 Jul. 28, 2022

(30) Foreign Application Priority Data
May 31, 2019 (JP) ................... 2019-101996

(51) Int. Cl.
B23P 6/00 (2006.01)
F01D 11/22 (2006.01)
(Continued)

(52) U.S. Cl.
CPC .............. F01D 11/22 (2013.01); B23P 6/00 (2013.01); F01D 11/001 (2013.01);
(Continued)

(58) Field of Classification Search
CPC ..................... Y10T 49/719; Y10T 29/4932
See application file for complete search history.

(56) References Cited

U.S. PATENT DOCUMENTS 5,333,993 A * 8/1994 Stueber ............... F01D 11/001
415/178
5,362,072 A 11/1994 Dalton
(Continued)

FOREIGN PATENT DOCUMENTS

CN 2145870 11/1993
CN 2435721 6/2001
(Continued)

OTHER PUBLICATIONS

International Search Report dated Jul. 21, 2020 in International Application No. PCT/JP2020/021199, with English-language translation.
(Continued)

Primary Examiner — Sarang Afzali
(74) Attorney, Agent, or Firm — Wenderoth, Lind & Ponack, L.L.P.

(57) ABSTRACT

A steam turbine includes a rotary shaft, a blade provided on an outer peripheral surface of the rotary shaft, a casing covering the rotary shaft and the blade from an outer peripheral side, a vane provided on an inner peripheral surface of the casing, and a seal device including a seal ring provided between the outer peripheral surface and the vane and a position adjusting portion configured to adjust a position of the seal ring in a radial direction. A seal clearance adjusting method includes a measurement step of measuring a length of the seal ring in the radial direction from a predetermined reference position as a reference length, a preparation step of preparing an unused seal ring, and an adjustment step of adjusting a length of the unused seal ring
(Continued)

from the reference position to be the reference length by the position adjusting portion.

4 Claims, 7 Drawing Sheets

(51) Int. Cl.
  *F01D 11/00* (2006.01)
  *F01D 11/02* (2006.01)
(52) U.S. Cl.
  CPC ........ *F01D 11/025* (2013.01); *F05D 2220/31* (2013.01); *F05D 2240/55* (2013.01); *Y10T 29/4932* (2015.01)

(56) References Cited

U.S. PATENT DOCUMENTS

| 5,509,780 | A | 4/1996 | Synfelt | |
|---|---|---|---|---|
| 6,208,953 | B1 | 3/2001 | Milek et al. | |
| 6,318,728 | B1 | 11/2001 | Addis et al. | |
| 9,488,060 | B2 * | 11/2016 | Bowman | F01D 11/22 |
| 10,316,685 | B2 * | 6/2019 | Davis | F01D 11/22 |
| 2012/0315138 | A1 | 12/2012 | Rao et al. | |
| 2018/0142571 | A1 | 5/2018 | Mizumi et al. | |
| 2021/0102474 | A1 * | 4/2021 | Paulino | F01D 11/122 |

FOREIGN PATENT DOCUMENTS

| CN | 105631091 | 6/2016 |
|---|---|---|
| CN | 208383009 | 1/2019 |
| JP | 57-114110 | 7/1982 |
| JP | 59-054896 | 3/1984 |
| JP | 59-191467 | 12/1984 |
| JP | 62-248804 | 10/1987 |
| JP | 11-125518 | 5/1999 |
| JP | 2011-89427 | 5/2011 |
| JP | 2012-102656 | 5/2012 |
| JP | 2015-511677 | 4/2015 |
| JP | 2017-196016 | 11/2017 |
| JP | 2018-84169 | 5/2018 |
| WO | 2013/139881 | 9/2013 |

OTHER PUBLICATIONS

Written Opinion of the International Searching Authority dated Jul. 21, 2020 in International Application No. PCT/JP2020/021199, with English-language translation.

* cited by examiner

STEAM TURBINE SEAL CLEARANCE ADJUSTING METHOD

TECHNICAL FIELD

The present invention relates to a steam turbine seal clearance adjusting method and a steam turbine.

Priority is claimed on Japanese Patent Application No. 2019-101996, filed May 31, 2019, the content of which is incorporated herein by reference.

BACKGROUND ART

A steam turbine includes a rotary shaft which rotates about an axis, a plurality of blades which are integrally provided on the rotary shaft, a casing which covers the rotary shaft and the blades from an outer peripheral side, and a vane which is provided on an inner peripheral surface of the casing. A blade shroud which faces the inner peripheral surface of the casing is provided at a radially outer end portion of the blade. In order to suppress a leakage flow of steam, a seal device which has a seal ring protruding toward an outer peripheral surface of the blade shroud is provided on the inner peripheral surface of the casing. Further, a vane shroud which faces an outer peripheral surface of the rotary shaft is provided at a radially inner end portion of the vane. In order to suppress a leakage flow as described above, a seal device which has a seal ring protruding toward the outer peripheral surface of the rotary shaft is provided on an inner peripheral surface of the vane shroud.

During an operation of the steam turbine, the seal ring faces the outer peripheral surface of the blade shroud or the rotary shaft with a clearance interposed therebetween. However, the rotary shaft and the blade shroud may be displaced due to some disturbance factors and come into contact with these seal rings. In this case, the tip of the seal ring is worn to absorb the displacement and maintain the clearance. On the other hand, when the wear progresses significantly, it is necessary to replace or repair the seal ring.

Conventionally, when the seal ring (seal device) is replaced, the method described in Patent Document 1 is adopted as an example. In this method, the casing is first divided into an upper half portion and a lower half portion and the seal device and the vane disposed on the inner peripheral surface of the casing are exposed. Here, the casing may undergo slight thermal deformation due to the aging operation of the steam turbine. Therefore, before the seal ring is replaced, the casing is temporarily assembled until an operation state and a change in clearance due to the thermal deformation of the casing is measured. Based on the change amount, a shim is disposed between the upper half portion and the lower half portion of the casing (between flange portions) to correct the change in clearance.

CITATION LIST

Patent Document

Patent Document 1: Japanese Unexamined Patent Application, First Publication No. 2018-084169

SUMMARY OF INVENTION

Technical Problem

However, since it takes a long time to temporarily assemble the casing, the above-described method has a problem of prolonging the construction period. Further, there may be a case in which the thermal deformation of the casing is larger than expected and the amount of deformation cannot be completely absorbed by the shim described above. In this case, it is conceivable to cut the seal ring for further correction. However, there are many restrictions on the processing work that can be performed at the plant site and it is difficult to maintain processing accuracy. Thus, there has been an increasing demand for a technique capable of replacing the seal device without temporarily assembling the casing and processing the seal ring.

The present invention has been made to solve the above-described problems, and an object thereof is to provide a steam turbine seal clearance adjusting method and a steam turbine capable of easily and quickly performing repair.

Solution to Problem

A steam turbine seal clearance adjusting method according to an aspect of the present invention is a steam turbine repair method for a steam turbine after being operated, in which the steam turbine includes: a rotary shaft which is configured to rotate about an axis; a blade which is provided on an outer peripheral surface of the rotary shaft; a casing which covers the rotary shaft and the blade from an outer peripheral side; a vane which is provided on an inner peripheral surface of the casing; and a seal device which includes a seal ring provided between the outer peripheral surface of the rotary shaft and the vane and a position adjusting portion configured to adjust a position of the seal ring in a radial direction with respect to the axis, and the seal clearance adjusting method includes: a measurement step of measuring a length of the seal ring in the radial direction from a predetermined reference position as a reference length; a preparation step of preparing an unused seal ring; and an adjustment step of adjusting a length of the unused seal ring from the reference position to be the reference length by the position adjusting portion.

According to the above-described method, the measurement step is first performed on the steam turbine after being operated for a predetermined period. In this state, the length of the seal ring in the radial direction is changed as compared with an unused state due to wear or the like. In the measurement step, the length of the seal ring worn in this manner from the reference position is measured and set as the reference length. Here, the seal ring which is worn after a certain period of operation can be considered to be in a state in which at least the length value of the clearance between the seal ring and the outer peripheral surface of the rotary shaft is optimized even when the tip of the seal ring is worn out and the performance as a fin may deteriorate. As the length of the unused seal ring is adjusted to be the reference length in the subsequent adjustment step, it is possible to replace the seal ring while optimizing the clearance. In particular, the seal ring can be replaced and the alignment can be optimized without processing the seal ring or temporarily assembling the casing, and therefore the man-hours can be reduced.

In the steam turbine seal clearance adjusting method, the seal ring may include a seal base portion and a plurality of fin main bodies provided on an inner peripheral surface of the seal base portion, and when falling of the fin main body in a direction of the axis has occurred after the steam turbine is operated, after the adjustment step, a first correction step of adding, to the reference length, a decrease amount of a length of the seal ring in the radial direction caused by the falling may be further performed.

During the operation of the steam turbine, a force (thrust force) in the direction of the axis may be applied to the rotary shaft due to some disturbance factors including a collision of foreign matter such as a scale. When the rotary shaft is displaced in the direction of the axis due to the thrust force, the seal ring and the rotary shaft may come into contact with each other and the seal ring may fall (tilt) without maintaining its initial posture. When such falling occurs, the clearance between the tip of the seal ring and the outer peripheral surface of the rotary shaft (or the tip of the fin provided at the end portion of the blade and the inner peripheral surface of the seal portion on the casing side facing the tip of the fin) increases. Thus, it may be necessary to adjust the alignment (adjust the position of the seal ring) in consideration of the change amount of the clearance due to the falling when replacing the seal ring. In the above-described method, the decrease amount of the length of the seal ring in the radial direction caused by the falling is added to the value of the reference length obtained by the measurement step. Accordingly, it is possible to reproduce a state before the falling occurs with the unused seal ring. As a result, it is possible to optimize the clearance with higher accuracy.

In the steam turbine seal clearance adjusting method, when a contact mark with the seal ring is generated in the rotary shaft after the steam turbine is operated, after the adjustment step, a second correction step of adding, to the reference length, a decrease amount of a length of the seal ring in the radial direction caused by contact may be further performed.

When the rotary shaft and the seal ring are in particularly strong contact (when hard rubbing occurs), the tip portion of the seal ring may be lost due to excessive thermal expansion caused by friction and its length may decrease more than necessary. Accordingly, the clearance between the tip of the seal ring and the outer peripheral surface of the rotary shaft increases more than necessary values. Thus, it may be necessary to adjust the alignment (adjust the position of the seal ring) in consideration of the change amount of the clearance due to the loss when replacing the seal ring. In the above-described method, the decrease amount of the length of the seal ring in the radial direction caused by the loss is added to the value of the reference length obtained by the measurement step. Accordingly, it is possible to reproduce a state before the loss occurs with the unused seal ring. As a result, it is possible to optimize the clearance setting with higher accuracy.

A steam turbine according to an aspect of the present invention is a steam turbine including: a rotary shaft which is configured to rotate about an axis; a blade which is provided on an outer peripheral surface of the rotary shaft; a casing which covers the rotary shaft and the blade from an outer peripheral side; a vane which is provided on an inner peripheral surface of the casing; and a seal device which includes a seal ring provided between the outer peripheral surface of the rotary shaft and the vane, a holder disposed radially outside the seal ring and configured to support the seal ring, and a position adjusting portion configured to adjust a length from a reference position of the holder to a tip of the seal ring.

According to the above-described configuration, it is possible to change the length from the reference position of the holder to the tip of the seal ring by the position adjusting portion. Accordingly, it is possible to reproduce a state in which the clearance is optimized without processing the unused seal ring before the replacement when replacing the seal ring.

In the steam turbine, the position adjusting portion may include a bolt which is configured to support the seal ring to be relatively displaceable with respect to the holder by changing a screwing amount of the bolt.

According to the above-described configuration, it is possible to easily change the relative position of the seal ring with respect to the holder in accordance with the rotation amount (the screwing amount) of the bolt. Accordingly, it is possible to reproduce a state in which the clearance is optimized without processing the unused seal ring before the replacement when replacing the seal ring.

In the steam turbine, the position adjusting portion may include: a rack gear which is provided in the seal ring and extends in the radial direction; and a pinion gear which is provided in the holder and meshes with the rack gear.

According to the above-described configuration, it is possible to easily change the relative position of the seal ring with respect to the holder in accordance with the relative position of the pinion gear with respect to the rack gear. Accordingly, it is possible to reproduce a state in which the clearance is optimized without processing the unused seal ring before the replacement when replacing the seal ring.

Advantageous Effects of Invention

According to the present invention, it is possible to provide a steam turbine repair method and a steam turbine capable of easily and quickly performing repair.

DESCRIPTION OF EMBODIMENTS

First Embodiment

Figure 1:
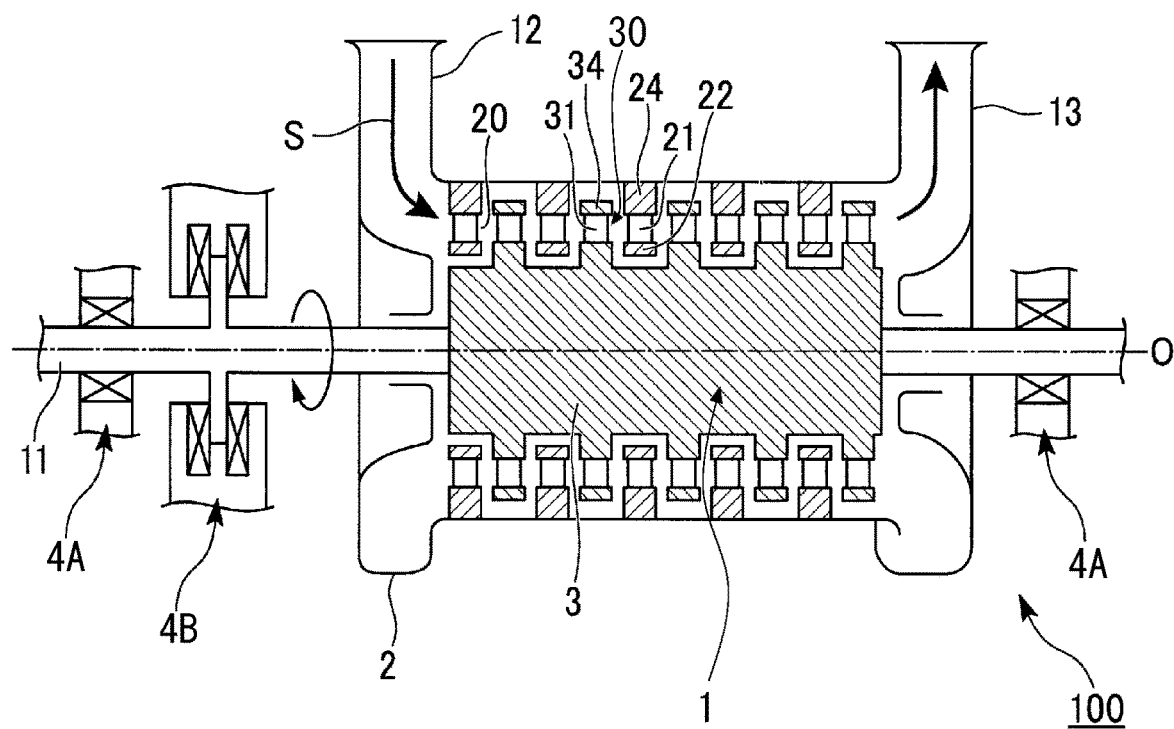
FIG. 1 is a schematic view showing a configuration of a steam turbine according to a first embodiment of the present invention.

A first embodiment of the present invention will be described with reference to FIGS. 1 to 8. A steam turbine 100 according to this embodiment includes a rotor 3 which extends in a direction of an axis O, a casing 2 (stator) which covers the rotor 3 from an outer peripheral side, and journal bearings 4A and a thrust bearing 4B which support a shaft end 11 of the rotor 3 to be rotatable around the axis O.

The rotor 3 includes a rotary shaft 1 which extends in the axis O and a plurality of blades 30 which are provided on an outer peripheral surface of the rotary shaft 1. The plurality of blades 30 are arranged at equal intervals in a circumferential direction of the rotary shaft 1. A plurality of rows of the blades 30 are arranged at equal intervals in the direction of the axis O. The blade 30 includes a blade main body 31 and a blade shroud 34. The blade main body 31 protrudes outward in a radial direction from the outer peripheral surface of the rotor 3. The blade main body 31 has a cross section having a blade profile when viewed in the radial direction. The blade shroud 34 is provided at a tip portion (radially outer end portion) of the blade main body 31.

The casing 2 is formed in a substantially tubular shape that covers the rotor 3 from the outer peripheral side. A steam supply pipe 12 for taking in steam S is provided on one side of the casing 2 in the direction of the axis O. A steam discharge pipe 13 for discharging the steam S is provided on the other side of the casing 2 in the direction of the axis O. The steam flows inside the casing 2 from one side to the other side in the direction of the axis O. In the following description, a direction in which the steam flows will be simply referred to as "a flow direction". Further, a side where the steam supply pipe 12 is positioned when viewed from the steam discharge pipe 13 will be referred to as an upstream side in the flow direction and a side where the steam discharge pipe 13 is positioned when viewed from the steam supply pipe 12 will be referred to as a downstream side in the flow direction.

A plurality of rows of vanes 20 are provided on an inner peripheral surface of the casing 2. The vane 20 includes a vane main body 21, a vane shroud 22, and a vane pedestal 24. The vane main body 21 is a member having a vane shape and connected to the inner peripheral surface of the casing 2 with the vane pedestal 24 therebetween. Further, the vane shroud 22 is provided at a tip portion (radially inner end portion) of the vane main body 21. Similar to the blade 30, a plurality of vanes 20 are arranged on the inner peripheral surface in the circumferential direction and the direction of the axis O. The blades 30 are disposed so as to enter regions between the vanes 20 adjacent to each other. That is, the vanes 20 and the blades 30 extend in a direction (the radial direction with respect to the axis O) intersecting the flow direction of steam.

Figure 2:
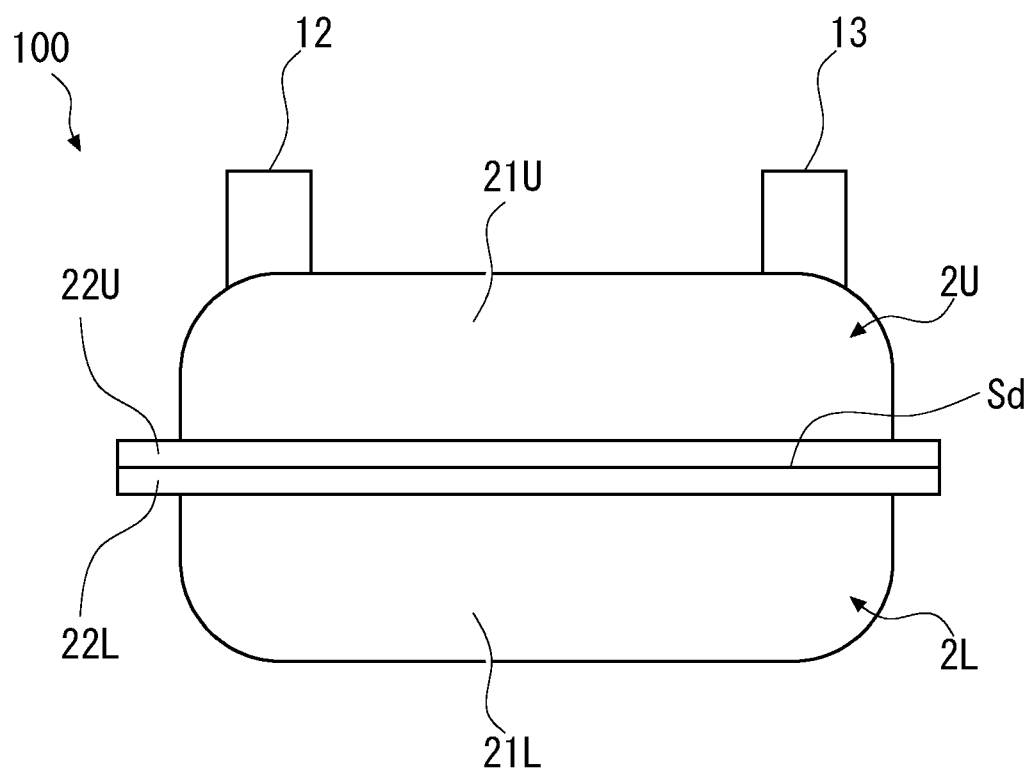
FIG. 2 is a side view showing a configuration of the steam turbine according to the first embodiment of the present invention.

As shown in FIG. 2, the casing 2 is divided into upper and lower parts, the upper half is an upper half casing 2U, and the lower half is a lower half casing 2L. The upper half casing 2U and the lower half casing 2L are plane-symmetrical with respect to a dividing surface Sd extending in the horizontal plane (however, a pipe portion is excluded). The upper half casing 2U includes a semi-cylindrical upper half casing main body 21U and an upper half flange portion 22U protruding outward from an end edge of the upper half casing main body 21U. Similarly, the lower half casing 2L includes a semi-cylindrical lower half casing main body 21L and a lower half flange portion 22L protruding outward from an end edge of the lower half casing main body 21L. The upper half casing 2U and the lower half casing 2L are fastened and fixed to each other by a bolt and a nut (not shown) while a lower surface of the upper half flange portion 22U and an upper surface of the lower half flange portion 22L are in contact with each other in the dividing surface Sd. Although not shown in the drawings, the casing 2 is provided with a plurality of legs for supporting the casing 2 on the floor surface. Further, FIG. 2 shows the steam turbine 100 having a configuration called an external casing as an example, but the steam turbine 100 of a double-casing structure in which another casing (internal casing) is provided inside the external casing may be used.

The steam S is supplied to the inside of the casing 2 having the above-described configuration via the steam supply pipe 12 on the upstream side. When the steam S passes through the inside of the steam turbine casing 2, the steam S alternately passes through flow paths formed by the vanes 20 and the blades 30. The vane 20 rectifies a flow of the steam S and the blade 30 applies a torque to the rotor 3 by pushing the mass of the rectified steam S against the blade 30. A torque of the rotor 3 is taken out from the shaft end 11 and is used to drive an external equipment (a generator or the like). As the rotor 3 rotates, the steam S is discharged toward a subsequent device (a condenser or the like) through the steam discharge pipe 13 on the downstream side.

The journal bearing 4A supports a load in the radial direction with respect to the axis O. One journal bearing 4A is provided at each of both ends of the rotor 3. The thrust bearing 4B supports a load in the direction of the axis O. The thrust bearing 4B is provided only at the end portion of the rotor 3 on the upstream side.

Figure 3:
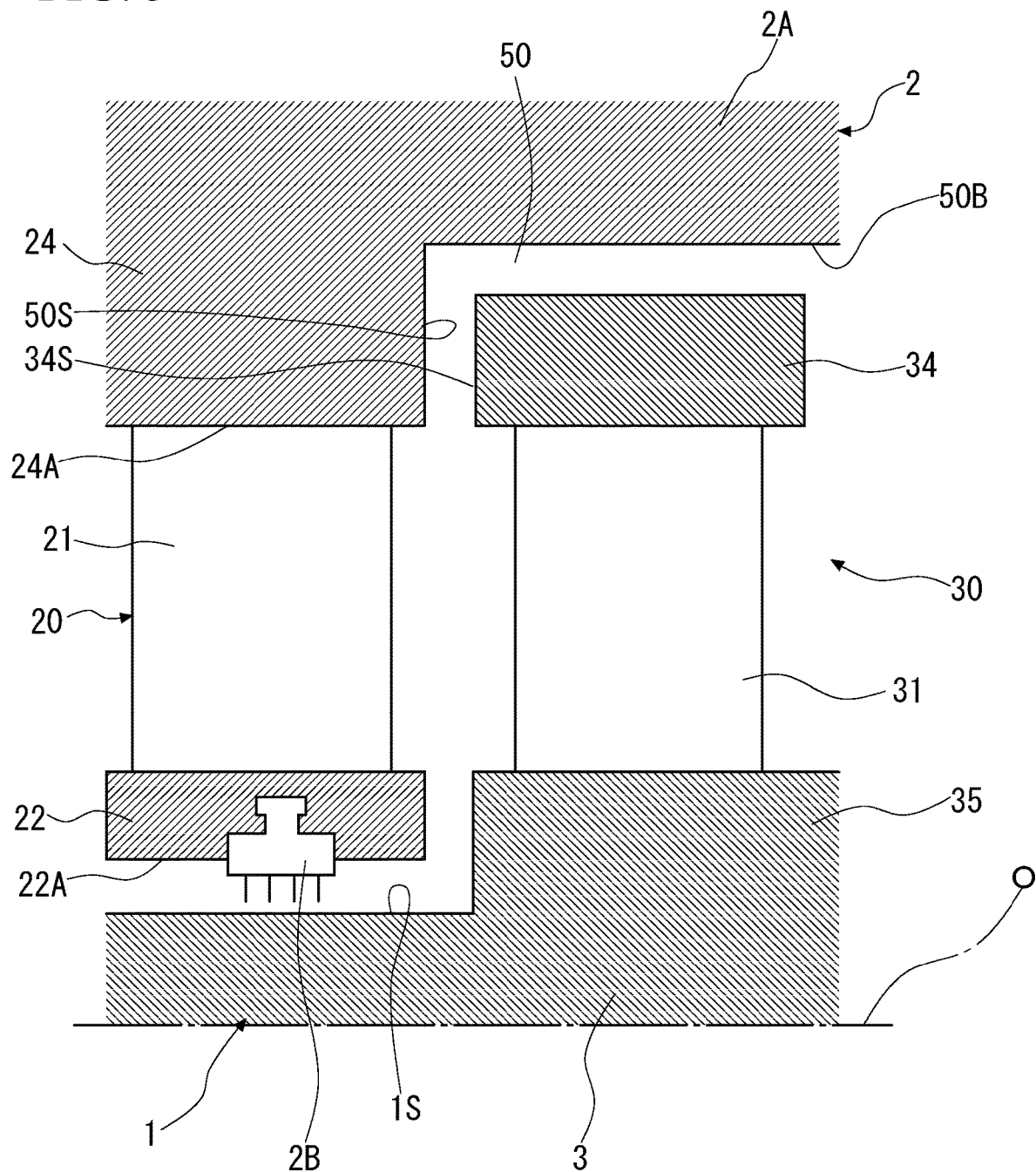
FIG. 3 is an enlarged cross-sectional view of a main part of the steam turbine according to the first embodiment of the present invention.

Next, a part around the vane 20 and the blade 30 will be described in detail with reference to FIG. 3. A cavity 50 recessed outward in the radial direction is formed on an inner peripheral surface of the casing main body 2A. The blade shroud 34 is accommodated in the cavity 50. Further, a clearance is formed between a shroud upstream surface 34S which is a surface of the blade shroud 34 facing the upstream side and a cavity upstream surface 50S which is a surface of the cavity 50 on the upstream side. A platform 35 which is disposed radially inside the blade main body 31 and supports the blade main body 31 is provided integrally with the rotary shaft 1.

A part of the casing main body 2A at a position corresponding to the vane 20 in the direction of the axis O is the vane pedestal 24. A radially outer end portion of the vane main body 21 is fixed to a pedestal inner peripheral surface 24A which is a surface of the vane pedestal 24 facing inward in the radial direction. The vane shroud 22 is provided at a radially inner end portion of the vane main body 21. A shroud inner peripheral surface 22A which is a surface of the vane shroud 22 facing inward in the radial direction faces a rotary shaft outer peripheral surface 1S which is the outer peripheral surface of the rotary shaft 1 with a clearance therebetween. A seal unit 2B (a seal device) to be described later is provided in this clearance. More specifically, the seal unit 2B is attached to the shroud inner peripheral surface 22A. The seal unit 2B is provided to seal flow (leakage flow) of the steam passing between the shroud inner peripheral surface 22A and the rotary shaft outer peripheral surface 1S.

Figure 4:
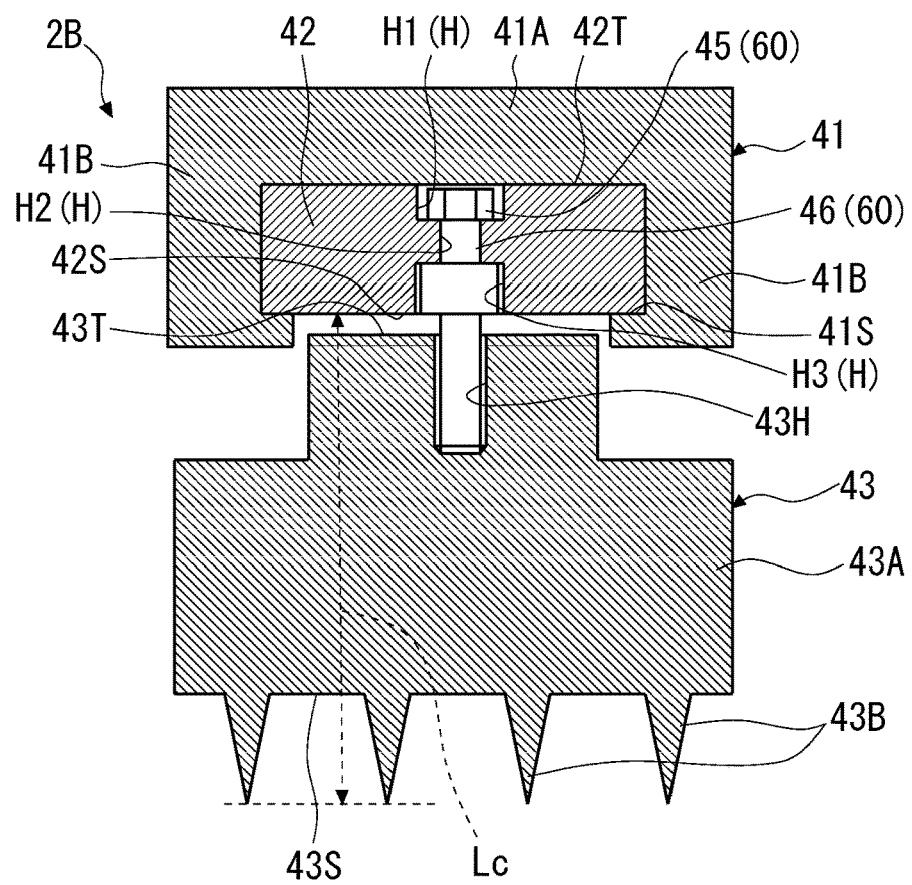
FIG. 4 is a cross-sectional view showing a configuration of a seal device according to the first embodiment of the present invention.

Next, a configuration of the seal unit 2B will be described with reference to FIG. 4. As shown in FIG. 4, the seal unit 2B includes a holder 41, a hook plate 42, a seal ring 43, and a nut 45 and an adjusting bolt 46 which serve as a position adjusting portion 60.

The holder 41 is a member that supports and fixes the seal ring 43 with respect to the vane shroud 22. The holder 41 includes a holder main body 41A and engagement protrusions 41B. The holder main body 41A is formed in an annular shape centering on the axis O. The pair of engagement protrusions 41B are provided at both end edges of the holder main body 41A in the direction of the axis O, respectively, and protrude inward in the radial direction with respect to the axis O. The hook plate 42 is accommodated in a space surrounded by the engagement protrusions 41B and the holder main body 41A.

The hook plate 42 is a member that supports and fixes the seal ring 43 to the holder 41. The hook plate 42 is formed in an annular shape centering on the axis O. A surface (plate lower surface 42S) of the hook plate 42 facing inward in the radial direction is in contact with a surface (protrusion upper surface 41S) of the engagement protrusion 41B facing outward in the radial direction. A bolt hole H is formed in the hook plate 42 and extends from a surface (plate upper surface 42T) of the hook plate 42 facing outward in the radial direction to the plate lower surface 42S. The nut 45 and the adjusting bolt 46 are inserted through the bolt hole H. The bolt hole H has a nut accommodating portion H1, an intermediate portion H2, and a concave portion H3 which are disposed in this order from the outside to the inside in the radial direction. The adjusting bolt 46 fixes the seal ring 43 to the holder 41 and the hook plate 42 so that the seal ring 43 is relatively displaceable with respect to the holder 41 and the hook plate 42 (that is, the radial position of the seal ring 43 is adjustable). The configurations of the nut 45 and the adjusting bolt 46 will be described later.

The seal ring 43 includes a seal base portion 43A and a plurality of fin main bodies 43B. The seal base portion 43A is a member that supports the fin main bodies 43B. The seal base portion 43A is formed in an annular shape centering on the axis O. A bolt hole 43H through which the adjusting bolt 46 is inserted is formed in a surface (base portion upper surface 43T) of the seal base portion 43A facing outward in the radial direction. A screw groove is formed on an inner peripheral surface of the bolt hole 43H. The screw groove meshes with the adjusting bolt 46.

The plurality of fin main bodies 43B are provided on a surface (base portion inner peripheral surface 43S) of the seal base portion 43A on the inside in the radial direction and are arranged at intervals in the direction of the axis O. Each fin main body 43B protrudes inward in the radial direction from the base portion inner peripheral surface 43S. The fin main body 43B has a tapered cross-section as the length in the direction of the axis O decreases from the outside to the inside in the radial direction. In this embodiment, an example in which four fin main bodies 43B are provided has been described, but the number of the fin main bodies 43B is not limited to four and can be appropriately changed in accordance with the specification or design. Further, it is not necessary for all the fin main bodies 43B to have the same shape and length, and a configuration in which the fin main bodies 43B having a plurality of different types of shapes and lengths are alternately arranged may be adapted.

Figure 5:
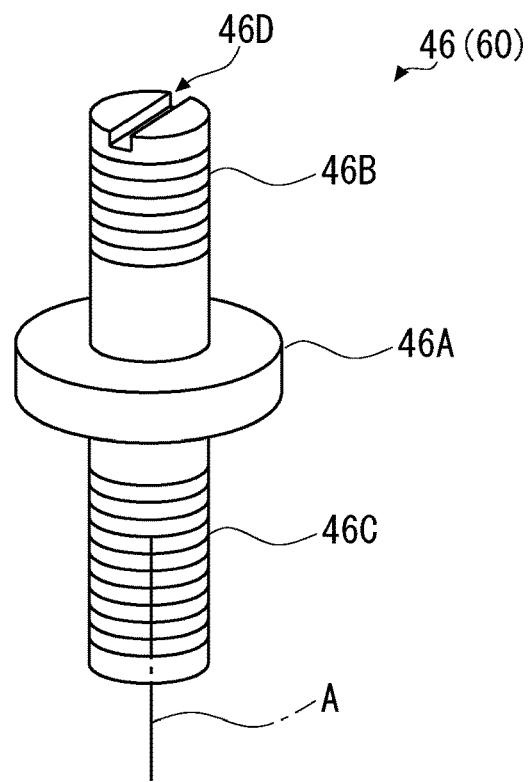
FIG. 5 is a perspective view showing a configuration of a bolt which is a position adjusting portion according to the first embodiment of the present invention.

As shown in FIG. 5, the adjusting bolt 46 includes a fixed disk portion 46A, a bolt upper portion 46B, and a bolt lower portion 46C. The fixed disk portion 46A is formed in a disk shape centering on a center axis A of the adjusting bolt 46. The fixed disk portion 46A is accommodated in the concave portion H3 formed in the lower surface (plate lower surface 42S) of the hook plate 42. The concave portion H3 is recessed outward in the radial direction from the plate lower surface 42S. When viewed from the radial direction, the concave portion H3 has a circular cross-sectional shape.

The bolt upper portion 46B is provided integrally with one side (surface facing outward in the radial direction when the adjusting bolt 46 is attached to the seal unit 2B) of the fixed disk portion 46A in the direction of the center axis A. The bolt upper portion 46B is formed in a columnar shape centering on the center axis A and a screw groove meshing with the nut 45 is formed on an outer peripheral surface of the bolt upper portion 46B. Further, for example, a groove 46D which engages with a tool such as a minus driver is formed in a surface of the bolt upper portion 46B facing outward in the radial direction. The groove 46D has a linear shape passing through the center axis A and has a rectangular cross-section.

The bolt lower portion 46C is provided integrally with the other side (surface facing inward in the radial direction when the adjusting bolt 46 is attached to the seal unit 2B) of the fixed disk portion 46A in the direction of the center axis A. Similarly to the bolt upper portion 46B, the bolt lower portion 46C is formed in a columnar shape centering on the center axis A and a male screw which engages with the screw groove of the bolt hole 43H is formed on an outer peripheral surface of the bolt lower portion 46C.

The nut 45 is fixed into the nut accommodating portion H1 formed on the upper surface (plate upper surface 42T) of the hook plate 42. That is, the nut 45 is fixed to the hook plate 42 so as not to be relatively rotatable with respect to the hook plate 42. The bolt upper portion 46B is inserted and fixed into the nut 45 in a state in which the screw groove of the bolt upper portion 46B meshes with the nut 45. Further, the bolt lower portion 46C is inserted and fixed into the bolt hole 43H of the seal ring 43 as described above. Accordingly, the seal ring 43 is fixed to the holder 41 and the hook plate 42. Here, when the adjusting bolt 46 is rotated around the center axis A with respect to the nut 45, the adjusting bolt 46 moves forward and backward along the screw groove. That is, by providing the nut 45 and the adjusting bolt 46, the position (the position in the radial direction with respect to the axis O) of the seal ring 43 can be changed.

Figure 6:
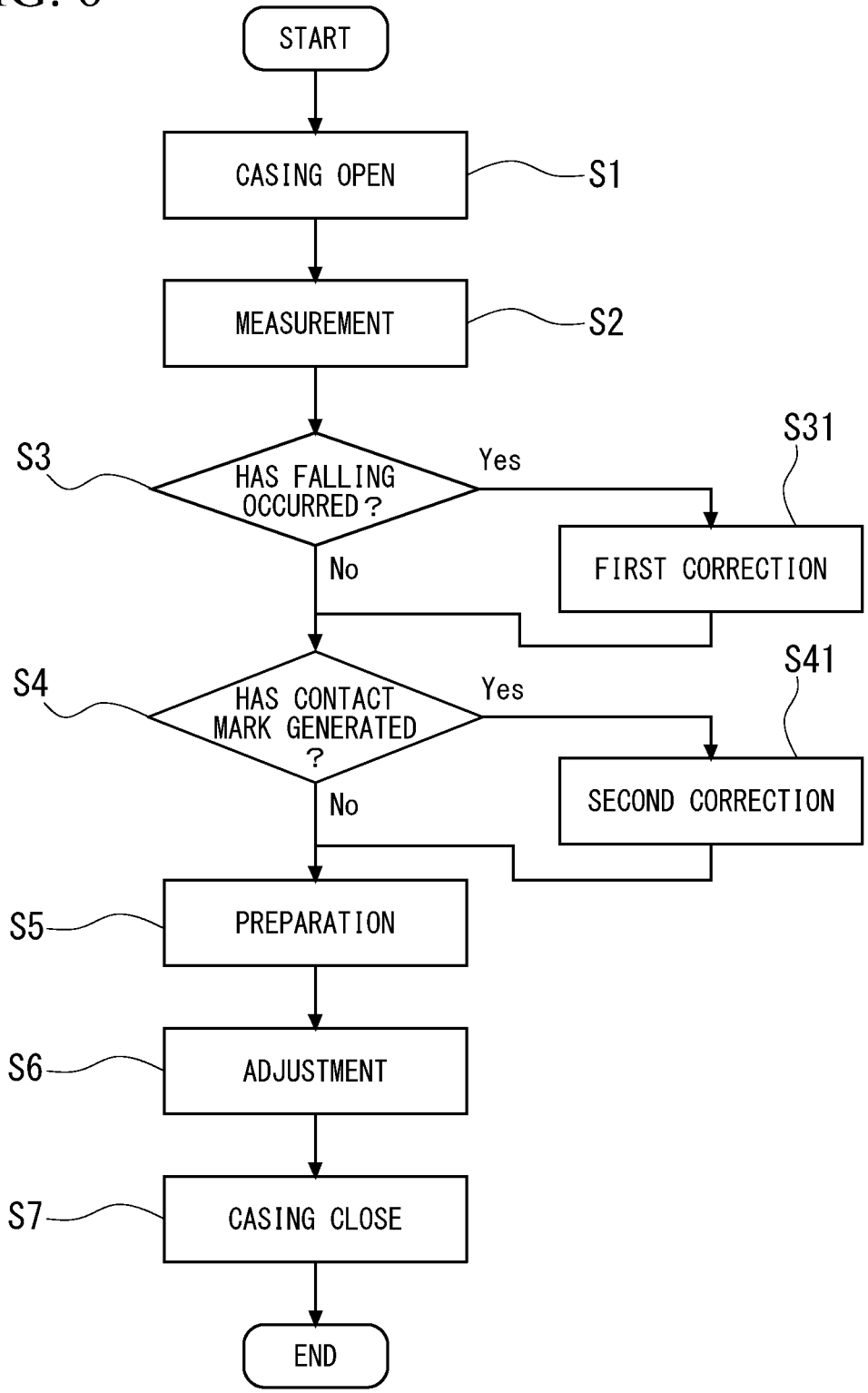
FIG. 6 is a flowchart showing a process of a steam turbine repair method according to the first embodiment of the present invention.

Next, a seal clearance adjusting method of the steam turbine 100 according to this embodiment will be described with reference to FIG. 6. This adjusting method is performed to replace the seal unit 2B when the seal unit 2B is worn and lost after the steam turbine 100 is operated for a predetermined period. This adjusting method includes a casing opening step S1, a measurement step S2, a first determination step S3, a first correction step S31, a second determination step S4, a second correction step S41, a preparation step S5, an adjustment step S6, and a casing closing step S7.

In the casing opening step S1, the casing 2 is disassembled along the dividing surface Sd. Specifically, the upper half casing 2U is separated from the lower half casing 2L. Accordingly, the seal unit 2B attached to the inner peripheral surface of the casing 2 is exposed. Next, the measurement step S2 is performed. In the measurement step S2, the radial length of the seal ring 43 is measured, more specifically, the length from the protrusion upper surface 41S of the holder 41 to the tip portion (radially inner end portion) of the fin main body 43B is measured and this value is set as a reference length Lc as shown in FIG. 4.

Here, in the steam turbine 100 after being operated for a certain period of time, when the length of the fin exceeds an actual allowable clearance value, the rotary shaft 1 and the seal ring 43 (fin main body 43B) come into contact with each other, so that the tip of the fin main body 43B is cut. Therefore, the separation distance (clearance) between the rotary shaft outer peripheral surface 1S of the rotary shaft 1 and the fin main body 43B is the minimum value in a range where the smooth rotation of the rotary shaft 1 is allowed. As will be described in detail later, the radial length of the seal unit 2B after the above-described operation is set as the reference length Lc and the reference length Lc is reproduced on a replacement unused seal unit 2B, so that the optimal clearance is maintained.

Figure 7:
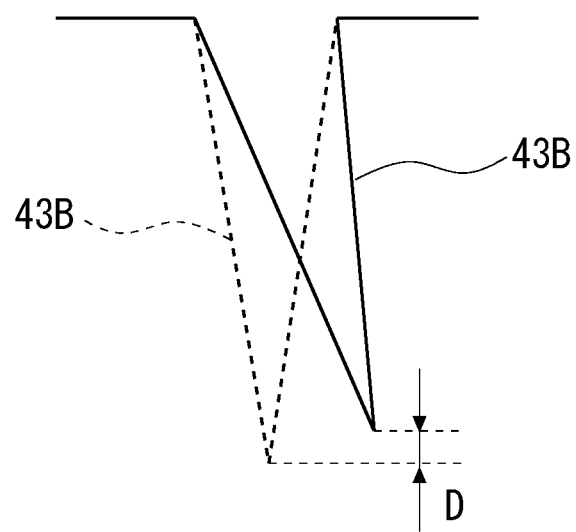
FIG. 7 is an explanatory diagram showing a seal ring in a state in which a falling occurs.

The first determination step S3 is performed after the measurement step S2. In the first determination step S3, it is determined whether or not "falling" has occurred in the fin main body 43B. As shown as an example of FIG. 7, the "falling" mentioned herein means a state in which the fin main body 43B is deformed to fall down in the direction of the axis O. In this state, as shown in FIG. 7, the radial position of the tip portion of the fin main body 43B moves outward in the radial direction by a change amount D. That is, the apparent radial length of the seal unit 2B decreases by the change amount D.

When it is determined that the falling has occurred by the first determination step S3, the first correction step S31 is performed. In the first correction step S31, the decrease amount (the change amount D) of the radial length of the seal unit 2B caused by the falling is added to the reference length Lc to be a new reference length Lc' (that is, Lc'=Lc+D). Then, the second determination step S4 is performed. Further, when it is determined that the falling has not occurred by the first determination step S3, the first correction step S31 is not performed and the second determination step S4 is performed.

Figure 8:
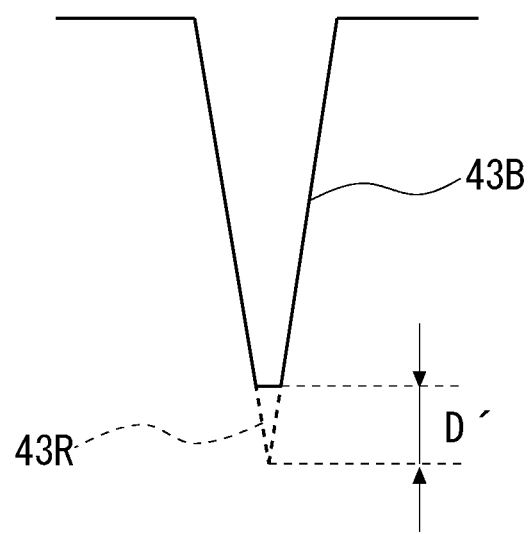
FIG. 8 is an explanatory diagram showing a seal ring in a state in which a loss occurs.

In the second determination step S4, it is determined whether or not a contact mark with the fin main body 43B is generated on the rotary shaft outer peripheral surface 1S. When the fin main body 43B comes into contact with the rotary shaft outer peripheral surface 1S to be pressed relatively strongly (that is, when hard rubbing occurs), the fin thermally expands due to the frictional heat between the fin main body 43B and the rotary shaft outer peripheral surface 1S and the tip of the fin main body 43B is lost more than when soft rubbing is performed. Due to this loss, the tip portion of the fin main body 43B disappears as shown in FIG. 8 as an example. Specifically, the tip portion is lost by the amount of a loss portion 43R and the radial length of the seal unit 2B decreases by a change amount D'.

When the contact mark is generated, it is possible to determine that the above-described loss occurs. In this case, the second correction step S41 is performed. In the second correction step S41, the decrease amount (the change amount D') of the radial length of the seal unit 2B caused by the loss is added to the reference length Lc. When the first correction step S31 is performed, D' is further added to the value of Lc'=Lc+D to be a new reference length Lc'2 (=Lc'+D'). Then, the subsequent preparation step S5 is performed. When the contact mark is not generated, the second correction step S41 is not performed and the preparation step S5 is performed.

In the preparation step S5, the unused seal unit 2B (seal ring 43) is prepared. Next, the adjustment step S6 is performed. In the adjustment step S6, the radial position of the unused seal unit 2B is adjusted to satisfy the reference length Lc (Lc', Lc'2) calculated by the above-described steps. Specifically, the screwing amount of the adjusting bolt 46 which is the position adjusting portion 60 is adjusted. Accordingly, when the unused seal ring 43 is attached to the casing 2, the clearance between the fin main body 43B and the rotary shaft outer peripheral surface 1S is immediately optimized. In other words, the clearance formed before the replacement is reproduced on the unused seal ring 43 without undergoing work such as cutting. Then, the upper half casing 2U and the lower half casing 2L are combined with each other (the casing closing step S7). With the above-described steps, the entire process of the repair method of the steam turbine 100 is completed.

As described above, in the above-described repair method, the measurement step S2 is performed on the steam turbine 100 after being operated for a predetermined period. In this state, the radial length of the seal ring 43 is changed as compared with the unused state due to wear or the like. In the measurement step S2, the radial length of the seal ring 43 worn in this manner from the reference position (the protrusion upper surface 41S) is measured and set as the reference length Lc. Here, the seal ring 43 which is worn after a certain period of operation can be considered to be in a state in which the clearance between the seal ring 43 and the rotary shaft outer peripheral surface 1S of the rotary shaft 1 is optimized. When the length of the unused seal ring 43 is adjusted to be the reference length Lc in the subsequent adjustment step S6, it is possible to replace the seal ring 43 while optimizing the clearance. In particular, the seal ring 43 can be replaced and the alignment can be optimized (the clearance can be optimized) without processing the seal ring 43 or temporarily assembling the casing 2, and therefore the man-hours can be reduced.

Here, a force (thrust force) in the direction of the axis O may be applied to the rotary shaft 1 due to some disturbance factors such as scale flying during the operation of the steam turbine 100. When the rotary shaft 1 is displaced in the direction of the axis O due to the thrust force, the seal ring 43 and the rotary shaft 1 may come into contact with each other and the seal ring 43 may fall (tilt) without maintaining its initial posture. When such falling occurs, the clearance between the tip of the seal ring 43 and the rotary shaft outer peripheral surface 1S of the rotary shaft 1 increases. Thus, it may be necessary to adjust the alignment (adjust the position of the seal ring 43) in consideration of the change amount of the clearance due to the falling when replacing the seal ring 43. In the above-described method, the decrease amount (the change amount D) of the radial length of the seal ring 43 caused by the falling is added to the value of the reference length Lc obtained by the measurement step S2. Accordingly, it is possible to reproduce a state before the falling occurs with the unused seal ring 43. As a result, it is possible to optimize the clearance with higher accuracy.

Further, when the rotary shaft 1 and the seal ring 43 are in particularly strong contact (when hard rubbing occurs), the tip portion of the seal ring 43 may be lost by the friction and its length may be decreased. Accordingly, the clearance between the tip of the seal ring 43 and the rotary shaft outer peripheral surface 1S of the rotary shaft 1 increases. Thus, it may be necessary to adjust the alignment (adjust the position of the seal ring) in consideration of the change amount of the clearance due to the loss when replacing the seal ring 43. In the above-described method, the decrease amount (the change amount D') of the radial length of the seal ring 43 caused by the loss is added to the value of the reference length Lc obtained by the measurement step S2 (or the value of the reference length Lc' calculated by the first correction step S31). Accordingly, it is possible to reproduce a state before the loss occurs with the unused seal ring 43. As a result, it is possible to optimize the clearance with higher accuracy.

Additionally, according to the above-described configuration, it is possible to easily change the relative position of the seal ring 43 with respect to the holder 41 (that is, change the radial length of the seal ring 43) in accordance with the rotation amount (screwing amount) of the adjusting bolt 46. Accordingly, it is possible to reproduce a state in which the clearance is optimized without processing the unused seal ring 43 before the replacement when replacing the seal ring 43.

Hereinabove, the first embodiment of the present invention has been described. It is possible to make various changes and modifications to the above method and configuration without departing from the spirit of the present invention. For example, in the first embodiment, a configuration in which the seal unit 2B is provided only in the vane 20 has been described. However, a position of the seal unit 2B is not limited thereto and the seal unit may be provided between the blade 30 and the inner peripheral surface of the casing 2.

Second Embodiment

Figure 9:
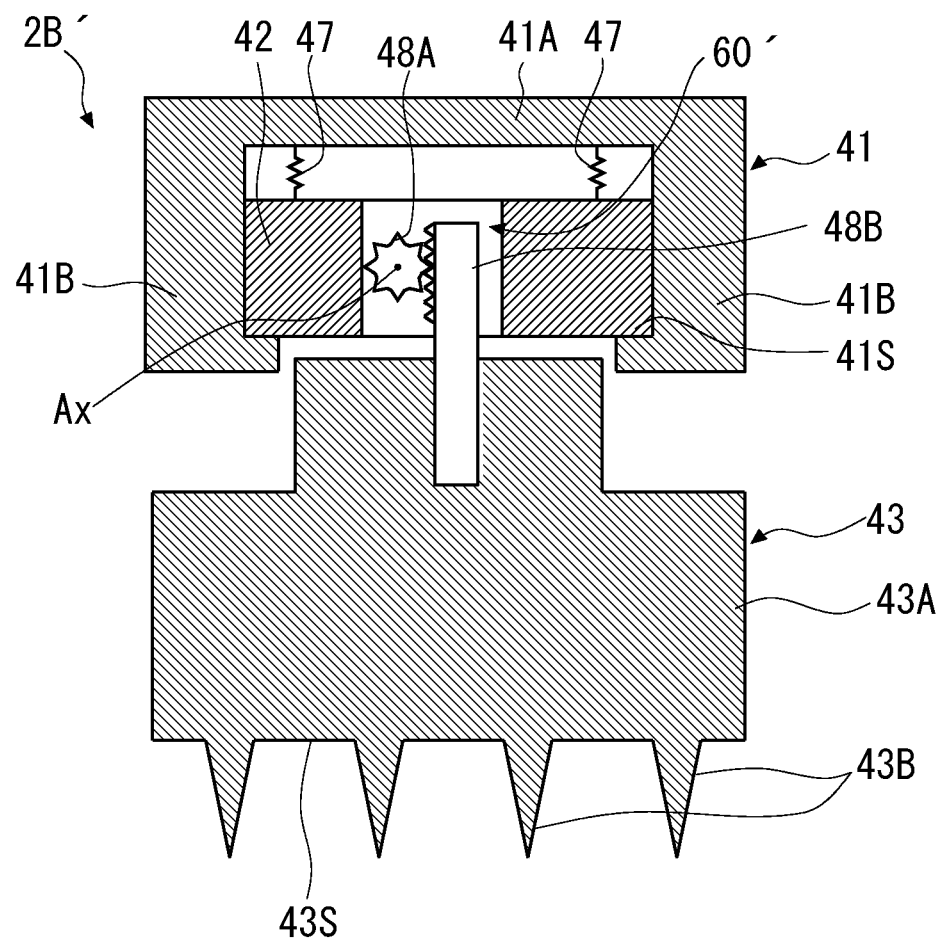
FIG. 9 is a cross-sectional view showing a configuration of a seal device according to a second embodiment of the present invention.

Next, a second embodiment of the present invention will be described with reference to FIG. 9. The same components as those in the first embodiment are designated by the same reference numerals, and detailed description thereof will be omitted. In this embodiment, the configuration of a position adjusting portion 60' of a seal unit 2B' is different from that of the first embodiment. The position adjusting portion 60' includes a pinion gear 48A which is provided in the hook plate 42 and a rack gear 48B which meshes with the pinion gear 48A and is fixed to the seal ring 43. The pinion gear 48A is supported inside the hook plate 42 to be rotatable about a rotation axis Ax extending in a direction orthogonal to the radial direction and the axis O. The rack gear 48B extends in the radial direction and moves forward and backward in the radial direction in accordance with the rotation of the pinion gear 48A. Accordingly, the seal ring 43 to which the rack gear 48B is fixed moves forward and backward in the radial direction. As a result, the radial length of the seal ring 43 is changed.

Further, in this embodiment, an elastic member 47 for biasing the hook plate 42 inward in the radial direction is formed in the holder main body 41A. Specifically, a leaf spring may be used as the elastic member 47.

According to the above-described configuration, it is possible to easily change the relative position of the seal ring 43 with respect to the holder 41 in accordance with the relative position of the pinion gear 48A with respect to the rack gear 48B. Accordingly, it is possible to reproduce a state in which the clearance is optimized without processing the unused seal ring 43 before the replacement when replacing the seal ring 43.

Hereinabove, the second embodiment of the present invention has been described. It is possible to make various changes and modifications to the above method and configuration without departing from the spirit of the present invention.

INDUSTRIAL APPLICABILITY

According to the present invention, it is possible to provide a steam turbine repair method and a steam turbine capable of easily and quickly performing repair.

REFERENCE SIGNS LIST

100 Steam turbine
1 Rotary shaft
1S Rotary shaft outer peripheral surface
2 Casing
2B, 2B' Seal unit
2L Lower half casing
2U Upper half casing
3 Rotor
4A Journal bearing
4B Thrust bearing
11 Shaft end
12 Steam supply pipe
13 Steam discharge pipe
20 Vane
21 Vane main body
22 Vane shroud
22A Shroud inner peripheral surface
24 Vane pedestal
24A Pedestal inner peripheral surface
30 Blade
31 Blade main body
34 Blade shroud
41 Holder
41A Holder main body
41B Engagement protrusion
41S Protrusion upper surface
42 Hook plate
42S Plate lower surface
42T Plate upper surface
43 Seal ring
43A Seal base portion
43B Fin main body
43S Base portion inner peripheral surface
43T Base portion upper surface
43H Bolt hole
43R Loss portion
45 Nut
46 Adjusting bolt
46A Fixed disk portion
46B Bolt upper portion
46C Bolt lower portion
46D Groove
47 Elastic member
48A Pinion gear
48B Rack gear
60, 60' Position adjusting portion
A Center axis
Ax Rotation axis
O Axis

The invention claimed is:

1. A steam turbine seal clearance adjusting method for a steam turbine after being operated,
wherein the steam turbine includes:
a rotary shaft which is configured to rotate about an axis;
a blade which is provided on an outer peripheral surface of the rotary shaft;
a casing which covers the rotary shaft and the blade from an outer peripheral side;
a vane which is provided on an inner peripheral surface of the casing; and
a seal device which includes
a seal ring provided between the outer peripheral surface of the rotary shaft and the vane,
a holder configured to support and fix the seal ring, and
a position adjusting portion configured to adjust a position of the seal ring in a radial direction with respect to the axis, wherein the position adjusting portion is configured to support the seal ring so as to be displaceable relative to the holder,
the seal clearance adjusting method comprising:
after operation of the steam turbine, measuring a length of the seal ring in the radial direction from a predetermined reference position as a reference length, the seal ring being a used seal ring;
after the measuring of the length, preparing an unused seal ring; and
after the preparing of the unused seal ring, replacing the used seal ring with the unused seal ring, and adjusting a length of the unused seal ring from the reference position to be the reference length with the position adjusting portion, wherein the reference length is a radial length of the used seal ring optimized by wear after a certain period of operation of the steam turbine.

2. The steam turbine seal clearance adjusting method according to claim 1, wherein:

the seal ring includes a seal base portion and a plurality of fin main bodies provided on an inner peripheral surface of the seal base portion; and when falling of the plurality of fin main bodies in a direction of the axis has occurred after the steam turbine is operated, after the measuring of the length, a first correction is performed by adding, to the reference length, a decrease amount of a length of the used seal ring in the radial direction caused by the falling.

3. The steam turbine seal clearance adjusting method according to claim 2, wherein when a contact mark with the seal ring is generated in the rotary shaft after the steam turbine is operated, after the measuring of the length, a second correction is performed by adding, to the reference length, a decrease amount of a length of the used seal ring in the radial direction caused by contact with the rotary shaft.

4. The steam turbine seal clearance adjusting method according to claim 1, wherein when a contact mark with the seal ring is generated in the rotary shaft after the steam turbine is operated, after the measuring of the length, a correction is performed by adding, to the reference length, a decrease amount of a length of the used seal ring in the radial direction caused by contact with the rotary shaft.

* * * * *